Oct. 4, 1960

A. H. ETT 2,955,230

APPARATUS FOR CONTROLLING THE SUPPLY OF
ELECTRICAL ENERGY TO A LOAD

Filed Nov. 26, 1958

INVENTOR.
ALLEN H. ETT

BY

Fordyce A. Bothwell

ATTORNEY

United States Patent Office 2,955,230
Patented Oct. 4, 1960

2,955,230

APPARATUS FOR CONTROLLING THE SUPPLY OF ELECTRICAL ENERGY TO A LOAD

Allen H. Ett, Glenside, Pa., assignor to Philco Corporation, Philadelphia, Pa., a corporation of Pennsylvania Filed Nov. 26, 1958, Ser. No. 776,590

8 Claims. (Cl. 315—80)

This invention relates to control of transfer of electrical energy from a supply means to a load. The invention is particularly applicable to the control of transfer of electrical energy from a low voltage source to a high voltage load device.

In certain instances it is desired to operate one or more high-voltage devices from a low-voltage source. For example, the present trend of development in automotive lighting is toward the use of high-voltage gaseous discharge lamps, such as neon or fluorescent lamps, which are much more efficient than incandescent lamps. The necessary high voltage for such lamps may be derived from the low voltage automobile battery by converting the D.-C. voltage of the battery to an A.-C. voltage or a simulated A.-C. voltage, and by transforming such voltage to the high voltage required for the lamps. However, the selective control of energization of the high voltage lamps has presented a problem. While it is possible to use a separate converter for each lamp and provide a low voltage switch in the low voltage converter circuit, this is impractical because it is too costly. Another possibility is the use of high voltage switches in the high voltage lamp circuits, but this too is impractical because some lamps operate at extremely high voltage.

One object of the present invention is to provide a satisfactory solution of this problem.

Another object of this invention is to provide a novel control system which, while particularly adapted for use in automotive lighting, may be employed in any instance where it may find useful application.

In accordance with this invention, the step-up transformer which is utilized to produce the required high voltage is provided with at least one magnetic shunt which isolates each secondary winding from the primary winding, and a low voltage control winding is provided in association with each secondary winding. By controlling the flow of current in each control winding, the energization of a high voltage load connected to the associated secondary winding can be controlled. For example, if a simple low voltage switch is connected in circuit with each control winding, when the switch is open full voltage appears across the associated secondary winding, but when the switch is closed the control winding is short circuited and the current therein causes magnetic saturation of the secondary core. The result is that a large portion of the main flux passes through the flux shunt, and the secondary voltage drops to a low value which is insufficient to operate the high voltage load. At the same time the effective removal of the load causes the input current to decrease to a low value.

This invention makes practical the use of a single converter, together with an associated transformer, for selectively controlling the energization of a plurality of high voltage A.-C. load devices from a low voltage D.-C. source, since by this invention each load device is controllable by means of a low voltage control device such as a switch included in circuit with the low voltage control winding.

The invention may be fully understood from the following detailed description with reference to the accompanying drawing wherein Fig. 1 is a face view of a transformer structure according to this invention, with the windings shown in section;

Figure 1:
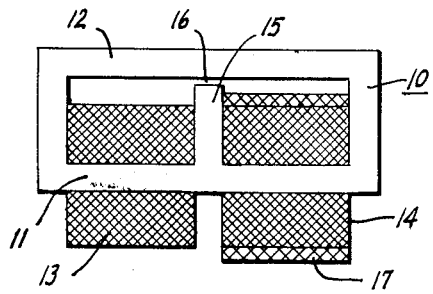

Referring first to Fig. 1, there is shown a step-up transformer comprising a magnetic core structure 10 including a main leg 11 and a flux return leg 12 forming a closed magnetic path or circuit, a primary winding 13 wound on one portion of the main leg 11, a secondary winding 14 wound on another portion of the main leg, a projection 15 intermediate said portions extending from the main leg 11 toward the return leg and terminating in proximity to the latter, forming a magnetic shunt which by reason of the air gap 16 has greater reluctance than the main flux path, and a low voltage control winding 17 consisting of a few turns wound about the secondary winding 14.

Figure 2:
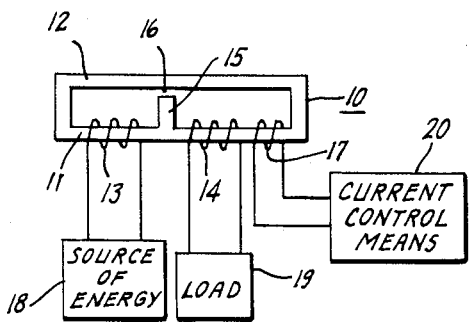
Fig. 2 is a diagrammatic illustration of a simple system according to this invention employing the transformer of Fig. 1.

Referring now to Fig. 2, the same transformer is shown diagrammatically as part of a simple system according to this invention. A suitable source of electrical energy 18 is connected to the primary winding 13, and a load 19 is connected to the secondary winding 14. It will be apparent that a low voltage is present across the low voltage control winding 17. By controlling the current flow in this winding, the supply of energy to the load 19 from the source 18 may be controlled. With high or infinite impedance in circuit with winding 17, there is little, if any, current flow therein and substantially the full output voltage appears across the secondary winding 14. With zero impedance in circuit with winding 17, i.e. with the winding short circuited, maximum current flows therein and causes magnetic saturation of the core portion on which the windings 14 and 17 are wound. This causes a large portion of the main flux to pass through the shunt path, thus by-passing the secondary winding 14. Consequently the voltage across the secondary winding drops substantially and since practically no current is drawn by the load, the input current to the primary winding 13 decreases to a very low value.

The above two conditions involve on-off operation of the load, and for such operation the current control means 20 may be a simple low voltage switch which may be opened and closed to effect energization and deenergization of the load 19. In the event, however, that it is desired to vary the voltage across the secondary winding 14 and thus vary the energy supplied to the load, the control means may be a variable impedance device such as a rheostat.

Figure 3:
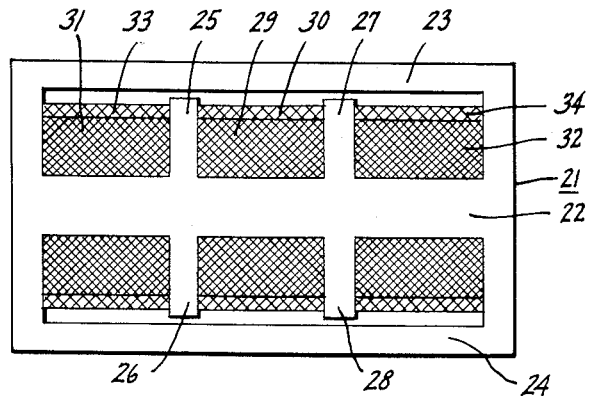
Fig. 3 is a face view of a transformer according to this invention for the control of energization of two high voltage devices.

Referring now to Fig. 3 there is shown a transformer comprising a magnetic structure 21 having a main leg 22, flux return legs 23 and 24, and flux shunts formed by the pairs of projections 25, 26 and 27, 28. A primary winding 29 is wound about the central portion of the main leg 22. A winding 30, the purpose of which will appear presently, is wound about the primary winding. Secondary windings 31 and 32 are wound about the outer portions of the main leg 22, and low voltage control windings 33 and 34 consisting of a few turns of heavy wire are wound about the secondary windings.

It will be seen that in this structure there are two magnetic shunt paths on each side of the primary winding 29, each shunt path having an air gap and therefore having greater reluctance than the main paths through the main leg 22 and the return legs 23 and 24.

Figure 4:
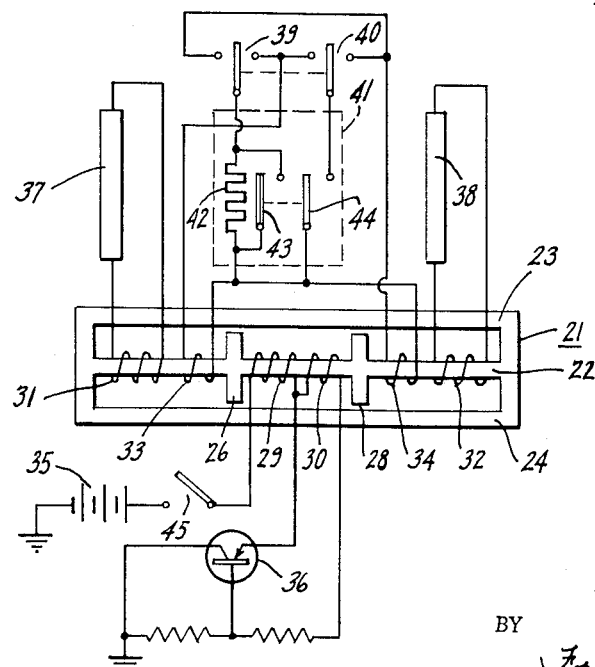
Fig. 4 is a diagrammatic illustration of a direction signal system, for a vehicle such as an automobile, employing the transformer of Fig. 3.

Referring now to Fig. 4, there is shown a direction signal system for a vehicle, such as an automobile, employing the transformer of Fig. 3. In this system the low D.-C. voltage of battery 35 is converted to a fluctuating voltage by a conventional converter including a transistor 36. The primary winding 29 and the battery 35 are serially included in the collector-emitter circuit of the transistor. Winding 30 is included in the base-emitter circuit of the transistor and serves as a feedback winding.

The fluctuating voltage produced by the converter is transformed to the required high voltage for operation of the direction-indicating gaseous discharge lamps 37 and 38 which are connected respectively to the secondary windings 31 and 32. For simplicity only one left-hand lamp and one right-hand lamp are shown, but it will be understood that series-connected front and rear lamps will be utilized in practice. The operation of the lamps is controlled by a conventional switch and flasher arrangement connected to the low voltage control windings 33 and 34. This arrangement comprises manually-operable tandem switches 39 and 40, and a flasher 41. The latter comprises a heater 42 and an associated shorting bimetal switch 43 and a switch 44 operable by the bimetal switch.

The operation of the system will now be described. Considering first the operation of the converter, when switch 45 is first closed current flows in the collector-emitter circuit of the transistor 36 and through the primary winding 29, and the change in flux in the transformer core causes a voltage to be induced in winding 30. This voltage is fed back to the base and, being negative at the base, it drives the transistor into saturation. When the transformer flux reaches a maximum, the feedback voltage falls to a low value and the transistor drops out of saturation. The added resistance of the partially open transistor causes the current through the primary winding to decrease and results in a regenerative action turning off the transistor. The operating cycle then repeats and continues to repeat as long as switch 45 is closed. The fluctuating current thus produced in the primary winding 29 causes high voltage to appear across each of the secondary windings 31 and 32 according to the turns ratio of each secondary with respect to the primary winding.

With the manually-operable tandem switches 39 and 40 open as shown, both of the control windings 33 and 34 are open circuited and the full output voltage appears across each secondary winding and both of the lamps 37 and 38 are lit. If desired, however, provision may be made to have the lamps normally unlit. For example, the low voltage primary circuit could be closed only when the selector switches 39 and 40 are closed. This would merely involve on-off switch means in the primary circuit ganged with the selector switches. In such case a manual switch in parallel with the on-off switch means could serve for turning on the lamps whenever desired.

Suppose now that the tandem switches 39 and 40 are thrown to the left to indicate a left turn. Switch 39 closes a circuit through winding 34 and heater 42, and the cyclic operation of switch 44 intermittently short circuits winding 33 through switch 40. This causes intermittent passage of flux through magnetic shunts 25 and 26, as will be understood from the previous description with reference to Fig. 2. The result is that the left-hand lamp 37 is flashed until the tandem switches 39 and 40 are restored to off position either manually or by the conventional mechanism upon completion of the left turn.

Suppose now that the tandem switches 39 and 40 are thrown to the right-hand position to indicate a right turn. Switch 39 closes a circuit through winding 33 and heater 42, and the cyclic operation of switch 44 intermittently short circuits winding 34 through switch 40 and causes flashing of the right-hand lamp 38 by virtue of intermittent passage of flux through the magnetic shunts 27 and 28. The flashing of lamp 38 continues until the tandem switches 39 and 40 are restored to off position.

It will be noted that in operation of the arrangement shown the heater element 42 and the associated bimetal element 43 are placed in circuit with the control winding for the lamp which is not to be flashed. The impedance of the heater element may be sufficiently low to cause that lamp to be extinguished while the other lamp is flashing. Thus in this arrangement the control winding for the non-flashing lamp serves both to turn off that lamp and to supply the energy for flashing the other lamp. If desired, however, provision could be made to have the non-flashing lamp remain on while the other lamp is flashing. For example, the heater element 42 could be energized directly from the battery 35 simply by having switch 39 control a separate energizing circuit including the battery.

From the foregoing description it will be seen that the present invention has provided a novel arrangement which enables low voltage control of one or more high voltage devices. Moreover, the invention is particularly advantageous in a system such as shown in Fig. 4 where it enables selective low voltage control of a plurality of high voltage A.-C. devices which are supplied from a low voltage D.-C. source through a single converter.

While certain embodiments of the invention and a particular application thereof have been illustrated and described, it will be understood that the invention is not limited thereto but contemplates such further embodiments and applications as may be deemed desirable.

I claim:

1. Apparatus for enabling manually-controlled energization of a high-voltage device from a low voltage source comprising: a step-up transformer having a magnetic flux path and a shunt flux path of greater reluctance than said main path, primary and secondary windings through which said main path extends and which are mutually separated by said shunt path, and a low voltage control winding transversed by the same flux which transverses said secondary winding; means for supplying electrical energy at low voltage to said primary winding; a high-voltage device connected to said secondary winding for energization through said step-up transformer; a circuit connected to said control winding to effect current flow therein due to the low voltage induced thereacross; and manually-controllable means in said circuit for changing the impedance thereof to thus control the current flow in said control winding, whereby to control the transfer of energy through said transformer to said device by reason of diversion of the magnetic flux through said shunt path.

2. Apparatus for enabling manually-controlled energization of a high-voltage device from a low voltage source comprising: a step-up transformer having a magnetic core structure providing a main flux path and a shunt flux path of greater reluctance than said main path, primary and secondary windings through which said main path extends and which are mutually separated by said shunt path, and a low voltage control winding traversed by the same flux which traverses said secondary winding; means for supplying electrical energy at low voltage to said primary winding; a high-voltage device connected to said secondary winding for energization through said step-up transformer; a circuit connected to said control winding to effect current flow therein due to the low voltage induced thereacross; and a manually-controllable switch in said circuit, whereby when said switch is open said control winding is open-circuited and substantially full voltage appears across said secondary winding, and when said switch is closed said control winding is short-circuited and a low voltage appears across said secondary winding by reason of diversion of the magnetic flux through said shunt path.

3. Apparatus for enabling manual selective control of energization of two high-voltage devices from a low-voltage source comprising: a step-up transformer having a magnetic core structure providing a main flux path and two shunt flux paths each of greater reluctance than said main path, a primary winding and two secondary windings through which said main path extends, said secondary windings being respectively separated from said primary winding by said two shunt paths, and two low voltage control windings respectively associated with said secondary windings and each traversed by the same flux which traverses the associated secondary winding; means for supplying electrical energy at low voltage to said primary winding; two high-voltage devices connected respectively to said secondary windings for energization through said step-up transformer; circuits connected to said control windings to effect current flow therein due to the low voltages induced across said control windings; and manually-controllable means for selectively changing the impedances of said circuits to thus selectively control the current flow in said control windings, whereby to selectively control the transfer of energy through said transformer to said devices by reason of diversion of the magnetic flux through said shunt paths.

4. Apparatus for enabling manual selective control of energization of two high-voltage devices from a low-voltage source comprising: a step-up transformer having a magnetic core structure providing a main flux path and two shunt flux paths each of greater reluctance than said main path, a primary winding and two secondary windings through which said main path extends, said secondary windings being respectively separated from said primary winding by said two shunt paths, and two low voltage control windings respectively associated with said secondary windings and each traversed by the same flux which traverses the associated secondary winding; means for supplying electrical energy at low voltage to said primary winding; two high-voltage devices connected respectively to said secondary windings for energization through said step-up transformer; circuits connected to said control windings to effect current flow therein due to the low voltages induced across said control windings; and manually-controllable switch means for selectively opening and closing said circuits to thus selectively control the current flow in said control windings, whereby to selectively control the transfer of energy through said transformer to said devices by reason of diversion of the magnetic flux through said shunt paths.

5. A direction signal system for a vehicle having a low-voltage battery comprising: a step-up transformer having a magnetic core structure providing a main flux path and two shunt flux paths each of greater reluctance than said main path, a primary winding and two secondary windings through which said main path extends, said secondary windings being respectively separated from said primary winding by said two shunt paths, and two low voltage control windings respectively associated with said secondary windings and each traversed by the same flux which traverses the associated secondary winding; converter means connected between said battery and said primary winding for supplying fluctuating current to the latter; two high-voltage lamps respectively connected to said secondary windings; and manually-controllable means connected to said control windings for effecting intermittent short-circuiting of either one of the control windings, thereby to effect flashing of the lamp connected to the associated secondary winding.

6. A system according to claim 5, wherein the last recited means comprises two-position manual switch means and flasher means controlled thereby.

7. A direction signal system for a vehicle having a low-voltage battery comprising: a step-up transformer having a magentic core structure providing a main flux path and two shunt flux paths each of greater reluctance than said main path, a primary winding and two secondary windings through which said main path extends, said secondary windings being respectively separated from said primary winding by said two shunt paths, and two low voltage control windings respectively associated with said secondary windings and each traversed by the same flux which traverses the associated secondary winding; converter means connected between said battery and said primary winding for supplying fluctuating current to the latter; two high-voltage lamps respectively connected to said secondary windings; and manually-controllable means for selectively controlling the flow of current in said control windings, whereby to control the transfer of energy through said transformer to said lamps.

8. A system according to claim 7 wherein said converter means comprises a transistor, a collector-emitter circuit serially including said primary winding and said source, a base-emitter circuit, and a feedback winding inductively associated with said primary winding and connected in said base-emitter circuit.

References Cited in the file of this patent

UNITED STATES PATENTS

| | | |
|---|---|---|
| 2,185,700 | Bedford | Jan. 2, 1940 |
| 2,245,192 | Gugel | June 10, 1941 |
| 2,673,321 | Stimler | Mar. 23, 1954 |
| 2,858,481 | Bird | Oct. 28, 1958 |